(12) United States Patent
Yang

(10) Patent No.: US 10,838,653 B2
(45) Date of Patent: Nov. 17, 2020

(54) ELECTRONIC DEVICE AND OPERATING METHOD THEREOF

(71) Applicant: SK hynix Inc., Gyeonggi-do (KR)

(72) Inventor: Chan Woo Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/199,680

(22) Filed: Nov. 26, 2018

(65) Prior Publication Data

US 2019/0265907 A1 Aug. 29, 2019

(30) Foreign Application Priority Data

Feb. 27, 2018 (KR) ........................ 10-2018-0023687

(51) Int. Cl.
*G06F 3/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ............................... G06F 3/0659; G06F 3/061
USPC ........................................................ 711/154
See application file for complete search history.

(56) References Cited

U.S. PATENT DOCUMENTS

| | | | |
|---|---|---|---|
| 7,013,336 B1 * | 3/2006 | King | G06F 11/3034 709/224 |
| 8,473,705 B2 | 6/2013 | Tainaka | |
| 2008/0244099 A1 * | 10/2008 | Machida | G06F 11/0745 710/6 |
| 2010/0037223 A1 * | 2/2010 | Yorimitsu | G06F 3/0611 718/100 |
| 2010/0100645 A1 * | 4/2010 | Yamaguchi | G06F 3/0611 710/6 |
| 2012/0303889 A1 * | 11/2012 | Coker | G11B 5/012 711/113 |
| 2014/0250262 A1 * | 9/2014 | Buxton | G06F 3/0659 711/103 |
| 2016/0283718 A1 * | 9/2016 | Baba | G06F 21/74 |

FOREIGN PATENT DOCUMENTS

KR 1020150116174 10/2015

* cited by examiner

*Primary Examiner* — Titus Wong
(74) *Attorney, Agent, or Firm* — IP & T Group LLP

(57) ABSTRACT

An electronic device comprising: a controller; and a non-transitory machine-readable storage medium configured to output status information in response to a status check command, and store instructions which are executed by the controller, wherein the instructions comprise: an instruction for generating an internal command to be serviced by the non-transitory machine-readable storage medium; an instruction for generating the status check command to transfer to the non-transitory machine-readable storage medium at a point of time that a waiting time corresponding to the internal command has elapsed after the internal command is transferred to the non-transitory machine-readable storage medium; an instruction for determining the operation status of the non-transitory machine-readable storage medium based on the status information; and an instruction for variably setting the waiting time based on the operation status.

12 Claims, 10 Drawing Sheets

ELECTRONIC DEVICE AND OPERATING METHOD THEREOF

CROSS-REFERENCES TO RELATED APPLICATION

The present application claims priority under 35 U.S.C. § 119(a) to Korean application number 10-2018-0023687, filed on Feb. 27, 2018, in the Korean Intellectual Property Office, which is incorporated herein by reference in its entirety.

BACKGROUND

1. Technical Field

Various embodiments of the present invention generally relate to an electronic device. Particularly, the embodiments relate to an electronic device including a controller and a non-transitory machine-readable storage medium.

2. Related Art

A memory system may be configured to store the data provided from an external device, in response to a write request from the external device. Also, the memory system may be configured to provide stored data to the external device, in response to a read request from the external device. The external device as an electronic device capable of processing data may include a computer, a digital camera or a mobile phone. The memory system may operate by being built in the external device, or may operate by being manufactured in a separable form and being coupled to the external device.

Since there is no mechanical driving part, a memory system using a memory device provides advantages such as excellent stability and durability, high information access speed, and low power consumption. Memory systems having such advantages include a universal serial bus (USB) memory device, memory cards having various interfaces, a universal flash storage (UFS) device, and a solid state drive (SSD).

SUMMARY

Various embodiments are directed to an electronic device which variably applies a time to output a status check command based on status information of nonvolatile memories.

In an embodiment, an electronic device comprising: a controller; and a non-transitory machine-readable storage medium configured to output status information in response to a status check command, and store instructions which are executed by the controller. The instructions may include: an instruction for generating an internal command to be serviced by the non-transitory machine-readable storage medium; an instruction for generating the status check command to transfer to the non-transitory machine-readable storage medium at a point of time that a waiting time corresponding to the internal command has elapsed after the internal command is transferred to the non-transitory machine-readable storage medium; an instruction for determining the operation status of the non-transitory machine-readable storage medium based on the status information; and an instruction for variably setting the waiting time based on the operation status.

In an embodiment, the instruction for determining the operation status is an instruction for determining the operation status based on whether response waiting information indicating that an operation by the internal command is completed is included in the status information.

In an embodiment, the instruction for determining the operation status comprises: an instruction for regenerating the status check command when the response waiting information is not included in the status information; and an instruction for counting the number of pieces of first status information including the response waiting information and provided in response to initial status check commands.

In an embodiment, the instruction for variably setting the waiting time is an instruction for shortening the waiting time when the number of pieces of first status information reaches a preset value.

In an embodiment, the instruction for determining the operation status comprises: an instruction for regenerating the status check command when the response waiting information is not included in the status information; and an instruction for counting the number of times that the status check command is regenerated.

In an embodiment, the instruction for variably setting the waiting time is an instruction for extending the waiting time when the number of times that the status check command is regenerated reaches a preset value.

In an embodiment, the non-transitory machine-readable storage medium comprises a plurality of storage groups, and each of the storage groups comprises a plurality of nonvolatile memories.

In an embodiment, the status information, the status check command, and the first status information correspond to a selected one among the storage groups.

In an embodiment, the operation status corresponds to the selected storage group.

In an embodiment, the waiting time corresponds to the selected storage group.

In an embodiment, the waiting times applied to the respective storage groups are set equally or differently based on the respective pieces of operation status of the storage groups.

In an embodiment, the instruction for setting the waiting time shortens a waiting time from a preset time, the waiting time being set to a storage group in which the number of pieces of first status information has reached a preset value, among the storage groups.

In an embodiment, the non-transitory machine-readable storage medium comprises a plurality of storage groups, and each of the storage groups comprises a plurality of nonvolatile memories.

In an embodiment, the status information, the status check command, and the first status information correspond to a selected one among the storage groups.

In an embodiment, the operation status corresponds to the selected storage group.

In an embodiment, the waiting time corresponds to the selected storage group.

In an embodiment, the waiting times applied to the respective storage groups are set equally or differently based on the respective pieces of operation status of the storage groups.

In an embodiment, the instruction for setting the waiting time extends a waiting time from a preset time, the waiting time being set to a storage group in which the number of times that the status check command is regenerated has reached a preset value, among the storage groups.

In an embodiment, the status information, the status check command, and the first status information correspond to a selected one among the nonvolatile memories.

In an embodiment, the operation status corresponds to the selected nonvolatile memory.

In an embodiment, the waiting time corresponds to the selected nonvolatile memory.

In an embodiment, the waiting times applied to the respective nonvolatile memories are set equally or differently based on the respective pieces of operation status of the nonvolatile memories.

In an embodiment, the instruction for setting the waiting time shortens a waiting time from a preset time, the waiting time being set to a nonvolatile memory in which the number of pieces of first status information has reached a preset value, among the nonvolatile memories.

In an embodiment, the status information, the status check command and the first status information correspond to a selected one among the nonvolatile memories.

In an embodiment, the operation status corresponds to the selected nonvolatile memory.

In an embodiment, the waiting time corresponds to the selected nonvolatile memory.

In an embodiment, the waiting times applied to the respective nonvolatile memories are set equally or differently based on the respective pieces of operation status of the nonvolatile memories.

In an embodiment, the instruction for setting the waiting time extends a waiting time from a preset time, the waiting time being set to a nonvolatile memory in which the number of times that the status check command is regenerated has reached a preset value, among the nonvolatile memories.

In an embodiment, an operating method of an electronic device, the operating method comprising: generating an internal command to be serviced by the electronic device; generating the status check command after a waiting time corresponding to the internal command is elapsed; determining operation status of the electronic device based on status information which is generated in response to the status check command; and variably setting the waiting time based on the operation status.

In an embodiment, the determining the operation status comprises determining the operation status based on whether response waiting information indicating that an operation by the internal command is completed is included in the status information.

In an embodiment, regenerating the status check command when the status information does not include the response waiting information.

In an embodiment, the determining of the operation status comprises determining the operation status based on the number of pieces of first status information including the response waiting information and provided in response to initial status check commands.

In an embodiment, the variably setting the waiting time comprises shortening the waiting time when the number of pieces of first status information reaches a preset value.

In an embodiment, the determining of the operation status comprises determining the operation status based on the number of times that the status check command is regenerated.

In an embodiment, the variably setting the waiting time comprises extending the waiting time when the number of times that the status check command is regenerated reaches a preset value.

In an embodiment, an electronic device comprising: a memory device configured to provide a status report thereof in response to a status check command; and a controller configured to: provide a kind of operation command to control the memory device to perform an operation; and provide, after a waiting time from the providing the operation command, the memory device with an initial status check command corresponding the operation command to receive an initial status report, wherein the controller, when the initial status report indicates a busy status, provides the memory device with one or more subsequent status check commands corresponding to the operation command to receive a subsequent status report indicating a ready status, and wherein the controller shortens the waiting time corresponding to the kind of operation command when a reception number of the initial status reports corresponding to the kind of operation command and indicating the ready status reaches a preset value.

In an embodiment, an electronic device comprising: a memory device configured to provide a status report thereof in response to a status check command; and a controller configured to: provide a kind of operation command to control the memory device to perform an operation; and provide, after a waiting time from the providing the operation command, the memory device with an initial status check command corresponding the operation command to receive an initial status report, wherein the controller, when the initial status report indicates a busy status, provides the memory device with one or more subsequent status check commands corresponding to the operation command to receive a subsequent status report indicating a ready status, and wherein the controller lengthens the waiting time corresponding to the kind of operation command when a provision number of the subsequent status check commands corresponding to the kind of operation command reaches a preset value.

In an embodiment, there is provided an operating method of an electronic device which variably sets a point of time that a status check command is outputted. The operating method may include the steps of: generating an internal command corresponding to a host request received from a host device and executed by the electronic device; generating the status check command after a waiting time corresponding to the internal command has elapsed; determining operation information of the electronic device based on status information which is generated in response to the status check command; and variably setting the waiting time based on the operation information.

DETAILED DESCRIPTION

Figure 1:
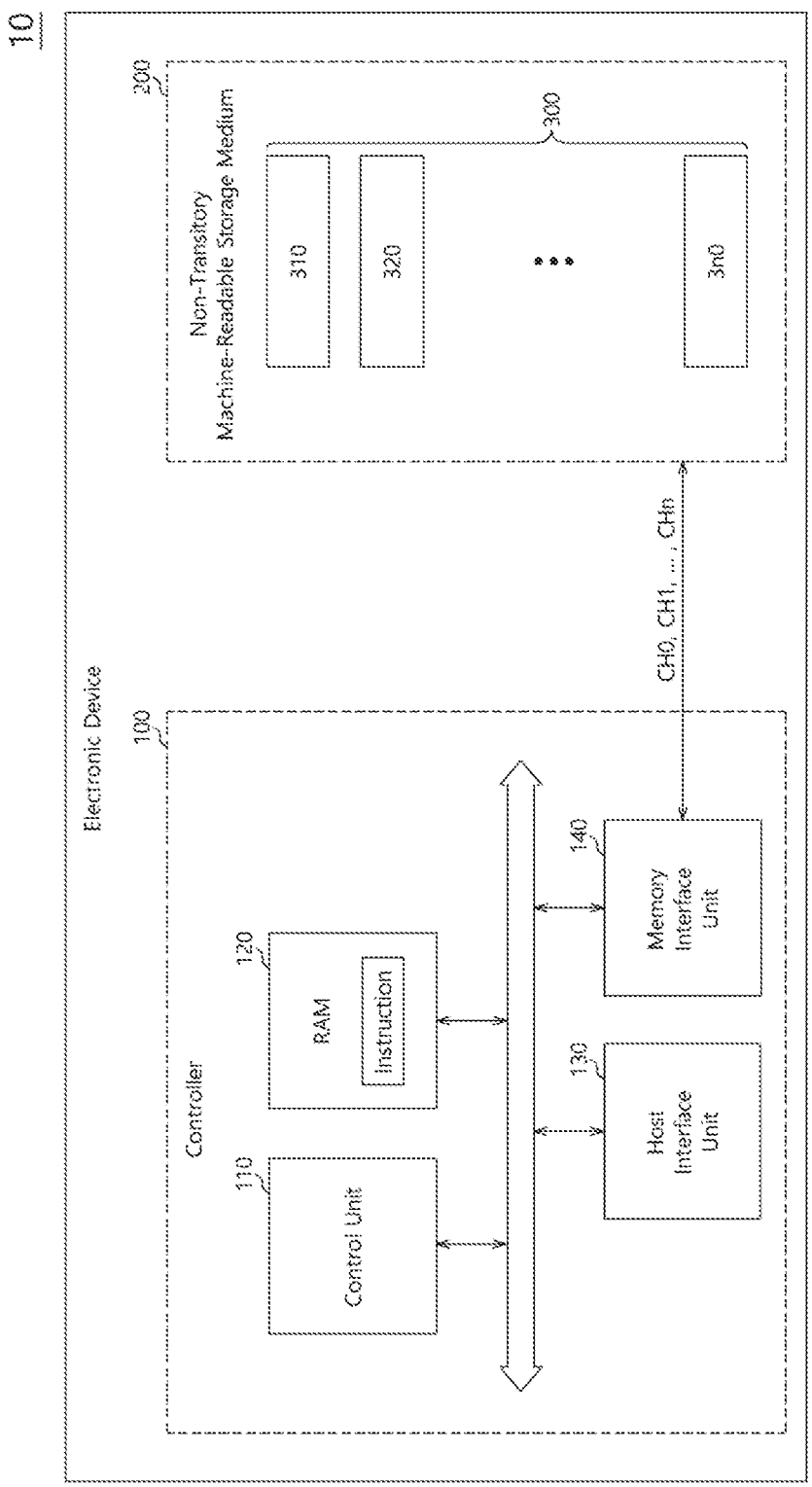
FIG. 1 is a block diagram illustrating a configuration of an electronic device in accordance with an embodiment of the present invention.

Advantages, features and methods of the present invention will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention. It is noted that reference to "an embodiment" does not necessarily mean only one embodiment, and different references to "an embodiment" are not necessarily to the same embodiment (s).

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

The terminology used herein is for the purpose of describing particular embodiments only and is not intended to be limiting of the present invention.

As used herein, singular forms may include the plural forms as well and vice versa, unless the context clearly indicates otherwise.

Hereinafter, a memory system and an operating method thereof will be described below with reference to the accompanying drawings through various examples of embodiments.

FIG. 1 is a block diagram illustrating the configuration of an electronic device 10 in accordance with an embodiment.

The electronic device 10 may store data which are accessed by a host device 400 such as a mobile phone, MP3 player, laptop computer, desktop computer, game machine, TV or in-vehicle infotainment system. The electronic device 10 may be referred to as a memory system.

Figure 5:
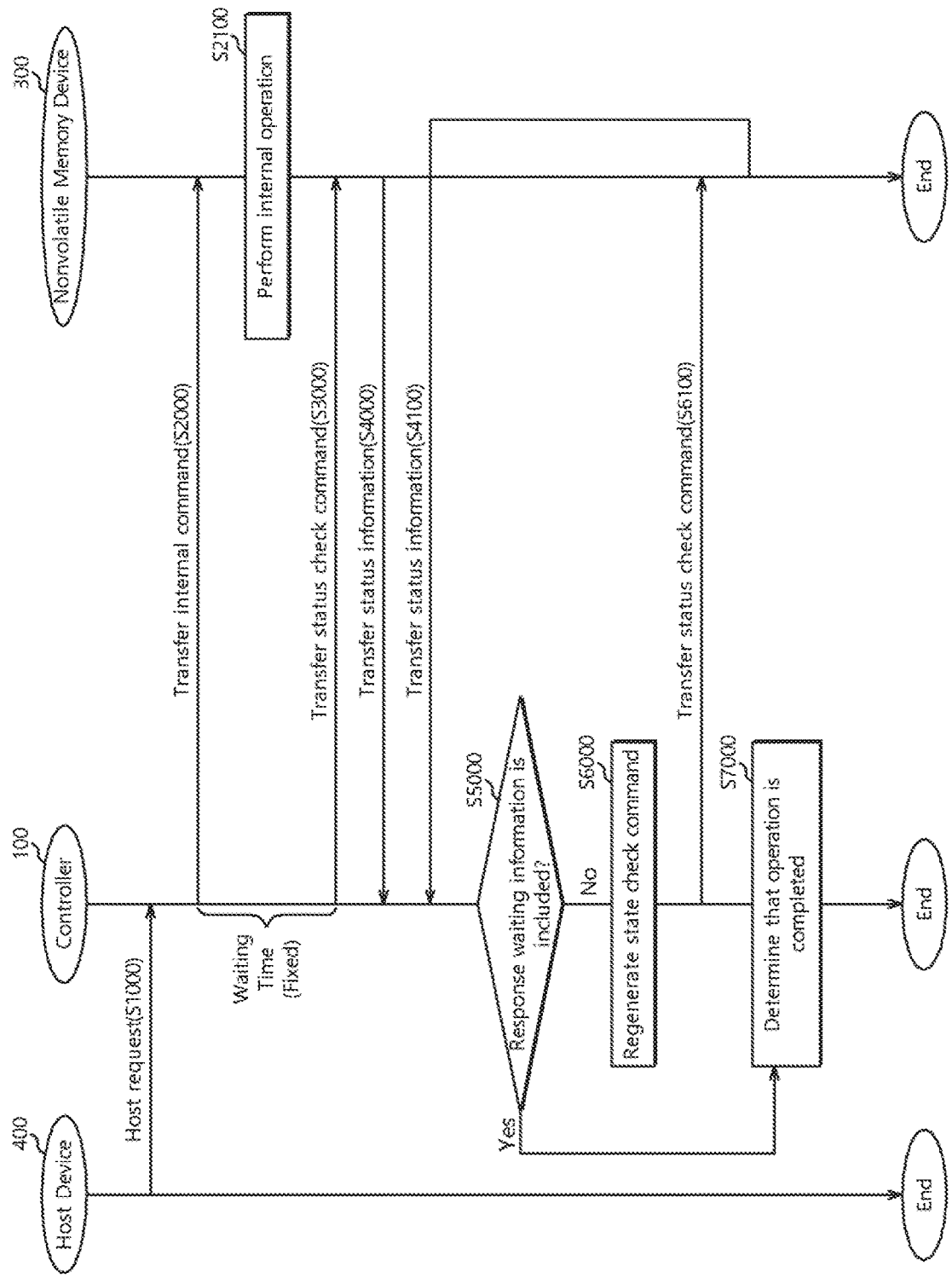
FIG. 5 is a flowchart describing a process of determining whether an operation performed by a nonvolatile memory device has been completed.

The electronic device 10 may be implemented with any one of various storage devices, depending on a host interface indicating a transmission protocol with a host device 400 of FIG. 5. For example, the electronic device 10 may be implemented with any one of various storage devices such as a solid status drive (SSD), a multi-media card (MMC, eMMC, RS-MMC or micro-MMC), a secure digital card (SD, mini-SD or micro-SD), a universal storage bus (USB) storage device, a universal flash storage (UFS) device, a personal computer memory card international association (PCMCIA) card-type storage device, a peripheral component interconnection (PCI) card-type storage device, a PCI express (PCI-e or PCIe) card-type storage device, a compact flash (CF) card, a smart media card and a memory stick.

The electronic device 10 may be fabricated as any one of various types of packages. For example, the electronic device 10 may be fabricated as any one of various types of packages such as a package on package (POP), a system on chip (SOC), a multi-chip package (MCP), a chip on board (COB), a wafer-level fabricated package (WFP) and a wafer-level stack package (WSP).

The electronic device 10 may include a non-transitory machine-readable storage medium 200 for storing data. The non-transitory machine-readable storage medium 200 may include a nonvolatile memory device 200. The nonvolatile memory device 300 may include nonvolatile memories 310 to 3n0. The electronic device 10 may further include a controller 100 for controlling the nonvolatile memory device 300 to perform operations to the nonvolatile memories 310 to 3n0. In this specification, it is described that the non-transitory machine-readable storage medium 200 includes the nonvolatile memory device 300. However, the present embodiment is not limited thereto.

The nonvolatile memories 310 to 3n0 may communicate with the controller 100 through channels CH1, CH2, . . . , CHn (where n is a positive integer).

Figure 6:
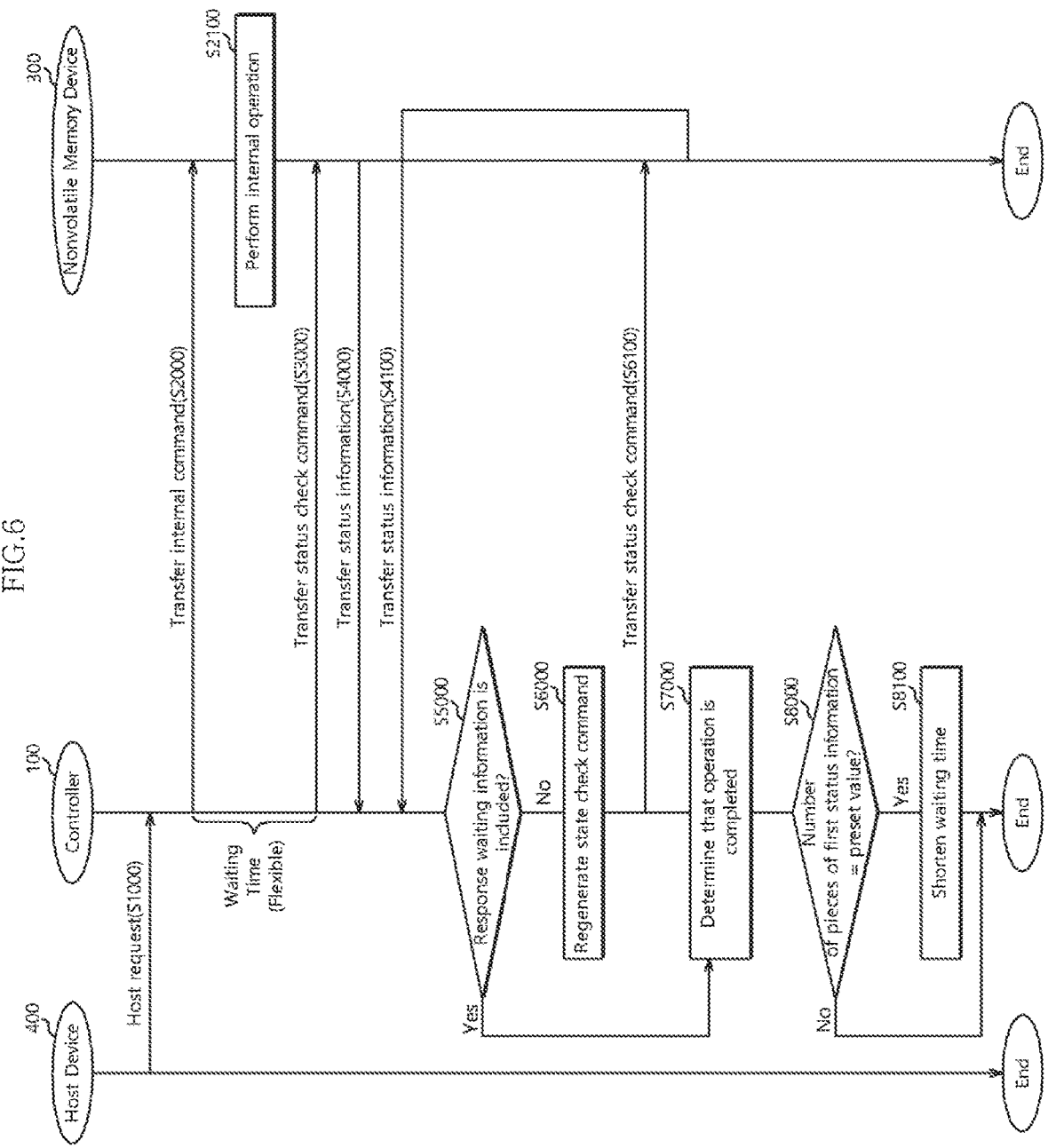
FIGS. 6 and 7 are flowcharts describing an operating method of an electronic device in accordance with an embodiment of the present invention.
Figure 7:
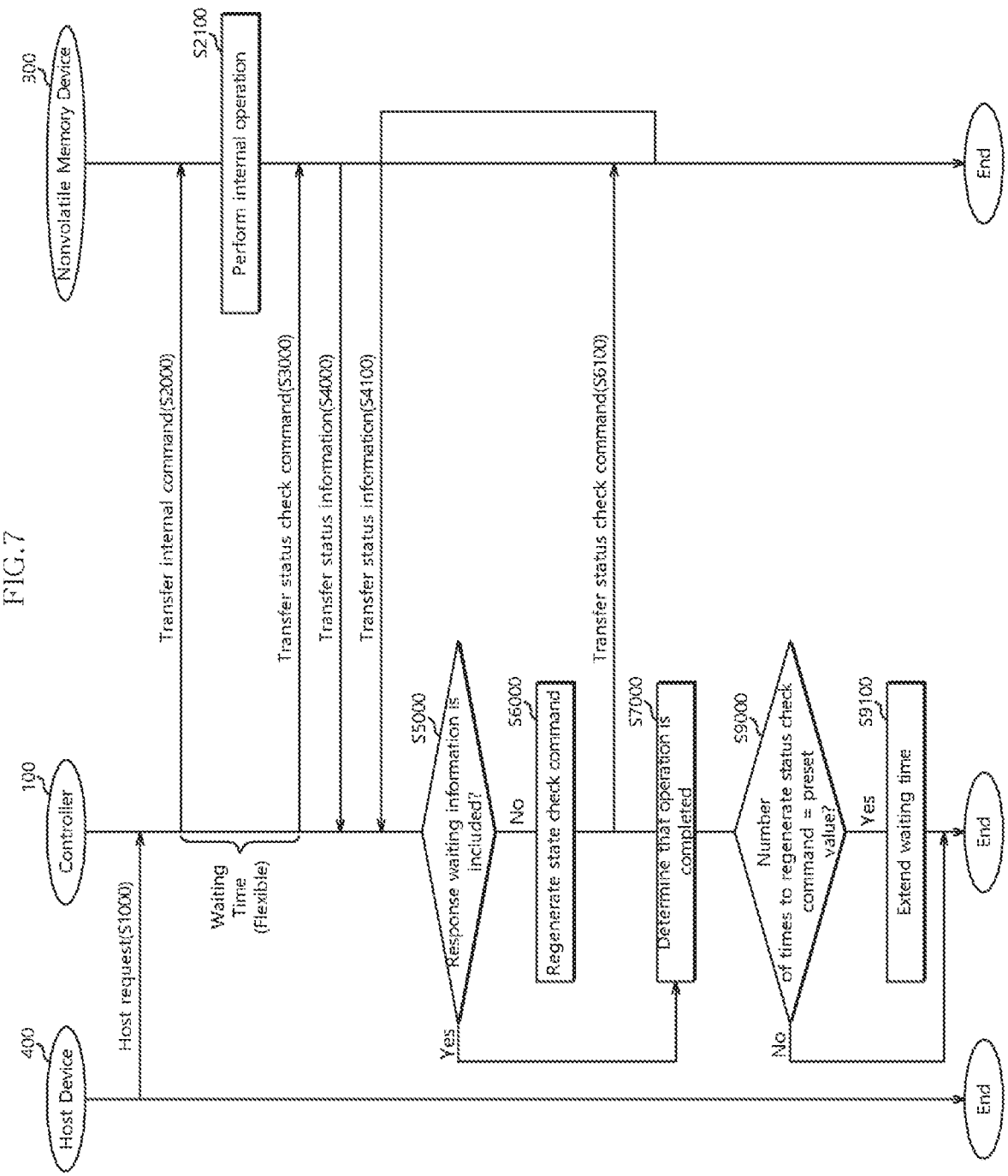

When a command is received from a host device, for example the host device 400 of FIGS. 5, 6 and 7, the controller 100 may control the nonvolatile memories 310 to 3n0 through the channels CH1, CH2, . . . , CHn according to the received command.

Before controlling the nonvolatile memories 310 to 3n0, the controller 100 may perform a status check operation for checking whether the nonvolatile memories 310 to 3n0 are available. For example, the controller 100 may determine whether the nonvolatile memories 310 to 3n0 are available, according to status information outputted from the nonvolatile memory device 300. The status information may include "ready" status information indicating that the nonvolatile memories 310 to 3n0 are available and "busy" status information indicating that the nonvolatile memories 310 to 3n0 are performing their operation. That is, the status information may include a ready/busy signal.

The status information indicating that the nonvolatile memories 310 to 3n0 are available may be referred to as status information including "response waiting information".

When the statuses of the nonvolatile memories 310 to 3n0 are determined on the basis of the status information, the controller 100 may select one or more available nonvolatile memories among the nonvolatile memories 310 to 3n0, and control the nonvolatile memory device 300 to perform an operation on the selected nonvolatile memory. During the status check operation for checking the status of the nonvolatile memory device 300, the controller 100 may determine the status of one nonvolatile memory coupled to a selected channel, or determine the statuses of a plurality of nonvolatile memories coupled to the selected channel at the same time.

The controller 100 may include a control component 110, a random access memory (RAM) 120, a host interface 130 and a memory interface 140.

The control component 110 may be implemented with a micro control unit (MCU) or a central processing unit (CPU). The control component 110 may process a request transmitted from the host device 400. In order to process the request, the control component 110 may drive a code-based instruction or algorithm loaded to the RAM 120, i.e. firmware (FW), and control internal function blocks and the nonvolatile memory device 300.

The RAM 120 may include a dynamic RAM (DRAM) or static RAM (SRAM). The RAM 120 may store firmware driven by the control component 110. The RAM 120 may store data required for driving the firmware, for example, meta data. That is, the RAM 120 may operate as a working memory of the control component 110. The RAM 120 may include and store a code-based instruction or algorithm driven by the control component 110.

The host interface 130 may interface with a host device, for example the host device 400 of FIGS. 5, 6 and 7, and the electronic device 10. For example, the host interface 130 may communicate with the host device 400 using any one of standard transmission protocols, such as a secure digital, Universal Serial Bus (USB), Multi-Media Card (MMC), Embedded MMC (eMMC), Personal Computer Memory Card International Association (PCMCIA), Parallel Advanced Technology Attachment (PATA), Serial Advanced Technology Attachment (SATA), Small Computer System Interface (SCSI), Serial Attached SCSI (SAS), Peripheral Component Interconnection (PCI), PCI express (PCIe or PCI-e), Universal Flash Storage (UFS), and the like.

The memory interface 140 may control the nonvolatile memory device 300 according to control of the control component 110. The memory interface 140 may provide control signals to the nonvolatile memory device 300. The control signals may include a command, address and control signal for controlling the nonvolatile memory device 300. The memory interface 140 may provide data to the nonvolatile memory device 300, or receive data from the nonvolatile memory device 300.

The nonvolatile memory device 300 may be implemented with any one of various nonvolatile memory devices including a NAND flash memory device, a NOR flash memory device, a ferroelectric RAM (FRAM) using a ferroelectric capacitor, a magnetic RAM (MRAM) using a tunneling magneto-resistive (TMR) film, a phase change RAM (PRAM) using chalcogenide alloys, and a resistive RAM (ReRAM) using a transition metal oxide.

Figure 2:
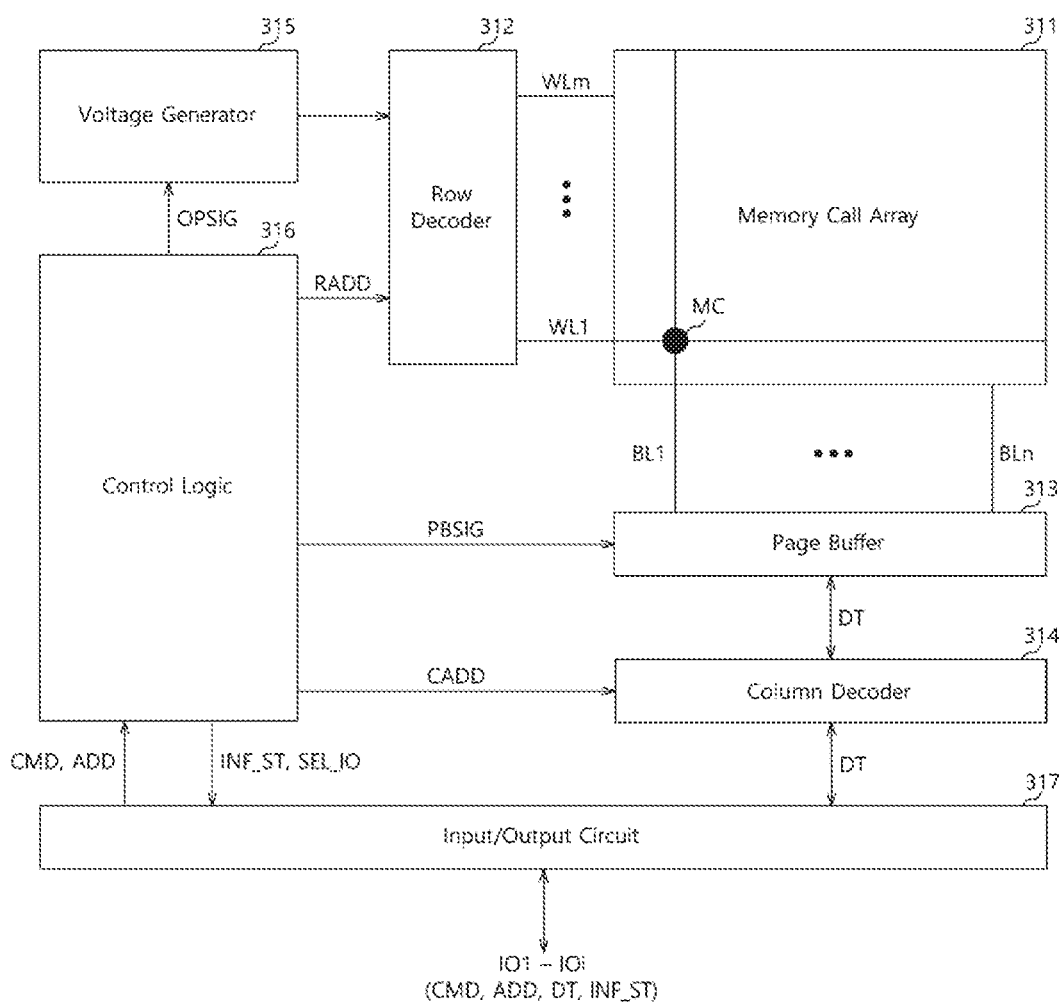
FIG. 2 illustrates a nonvolatile memory in accordance with an embodiment of the present invention.

Each of the nonvolatile memories 310 to 3n0 may include a memory cell array (for example, see memory cell array 311 of FIG. 2). Memory cells included in the memory cell array may be configured on a basis of memory cell group or memory cell, from the operational viewpoint or physical (or structural) viewpoint. For example, memory cells which are coupled to the same word line and read/written (or programmed) at the same time may be configured as a page. Furthermore, memory cells which are erased at the same time may be configured as a memory block. The memory cell array may include a plurality of memory blocks, and each of the memory blocks may include a plurality of pages.

FIG. 2 illustrates the nonvolatile memory 300 of FIG. 1 in accordance with an embodiment of the present invention, and the first nonvolatile memory 310 of the nonvolatile memory device 300 shown in FIG. 1 will be representatively described. Referring to FIGS. 1 and 2, the first nonvolatile memory 310 may include a memory cell array 311, a row decoder 312, a page buffer 313, a column decoder 314, a voltage generator 315, a control logic 316 and an input/output circuit 317.

The memory cell array 311 may include memory cells arranged in the respective intersections between word lines WL1 to WLm and bit lines BL1 to BLn. The memory cell array 311 may include a plurality of memory blocks configured in the same manner. The memory blocks may have a two-dimensional (2D) or three-dimensional (3D) structure. The 2D structure may indicate that memory cells are horizontally arranged on a semiconductor substrate, and the 3D structure may indicate that memory cells are vertically arranged on a semiconductor substrate.

The row decoder 312 may be coupled to the memory cell array 311 through the word lines WL1 to WLm. The row decoder 312 may be operated according to control of the control logic 316. The row decoder 312 may select one or more memory blocks among the memory blocks in response to a row address RADD, and transfer operation voltages received through the voltage generator 315 to the word lines WL1 to WLm coupled to the selected memory block or memory blocks.

The page buffer 313 may be coupled to the memory cell array 311 through the bit lines BL1 to BLn. Specifically, the page buffer 313 may operate as a write driver or sense amplifier in response to a page buffer control signal PBSIG received from the control logic 316. For example, during a write operation, the page buffer 313 may operate as a write driver for storing data DT provided from an external device into the memory cell array 311. For another example, during a read operation, the page buffer 313 may operate as a sense amplifier for reading data DT from the memory cell array 311.

The column decoder 314 may transfer the data DT between the page buffer 313 and the input/output circuit 317 in response to a column address CADD.

The voltage generator 315 may generate a voltage used for an internal operation of the first nonvolatile memory 310 according to control of the control logic 316. The internal operation may include read, write and erase operations. Specifically, the voltage generator 315 may generate various levels of operation voltages in response to an operation signal OPSIG. The voltages generated by the voltage generator 315 may be applied to the memory cells of the memory cell array 311.

The control logic 316 may control overall operations of the first nonvolatile memory 310 based on control signals provided from the external device. For example, the control logic 316 may control main operations of a memory chip, such as read, program and erase operations.

During a normal operation, the control logic 316 may output the operation signal OPSIG, the row address RADD, the page buffer control signal PBSIG and the column address CADD in response to a command and address corresponding to the program, read or erase operation.

During the status check operation, the control logic 316 may output status information INF_ST and input/output line select information SEL_IO in response to a command CMD received from the input/output circuit 317.

The control logic 316 may store status information INF_ST of the first nonvolatile memory 310, and output the status information INF_ST during the status check operation. The status information INF_ST may be continuously updated according to the operation of the first nonvolatile memory 310. For example, the status information INF_ST may be outputted as a ready/busy signal, and stored as data '1' or '0' depending on the operation status of the nonvolatile memory 310. When the first nonvolatile memory 310 is ready for a new operation, the status information INF_ST may be stored as data '1' indicating the ready status. In other words, the data '1' means the ready status. In an embodiment, when "response waiting information" is included in the status information INF_ST, the first nonvolatile memory 310 may be determined to be ready. Therefore, the status information INF_ST may be stored as data '1'. When the first nonvolatile memory 310 is performing a specific operation, the status information INF_ST may be stored as data '0' indicating the busy status. In other words, the data '0' means the busy status.

As described above, the status information indicating that the first nonvolatile memory 310 is ready or available for a new operation may be referred to as status information INF_ST including "response waiting information".

The input/output circuit 317 may receive the command CMD, the address ADD and the data DT from the controller 100, transfer the command CMD and the address ADD to the control logic 316, and transfer the data DT to the column decoder 314. Furthermore, the input/output circuit 317 may output the status information INF_ST through a preset input/output line among first to i-th input/output lines IO1 to IOi in response to the input/output line select information SEL_IO and the status information INF_ST received from the control logic 316. For example, when the first nonvolatile memory 310 is configured to correspond to the first input/output line IO01, the first nonvolatile memory 310 may transfer the status information INF_ST to the controller 100 through the first input/output line IO01 during the status check operation.

Figure 3:
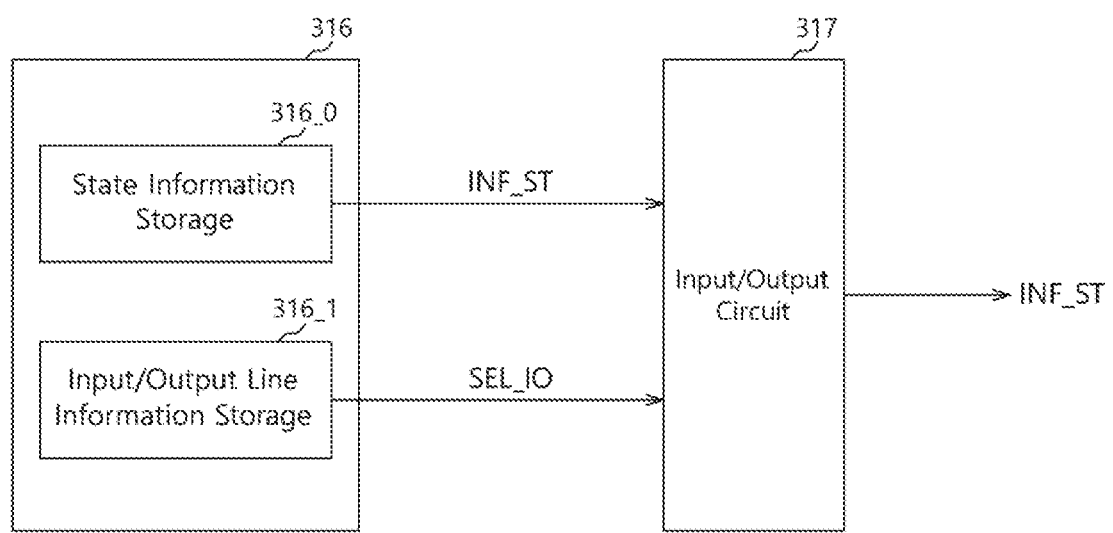
FIG. 3 illustrates a control logic of FIG. 2 in accordance with an embodiment of the present invention.

FIG. 3 illustrates the control logic 316 of FIG. 2 in accordance with an embodiment of the present invention.

Referring to FIG. 3, the control logic 316 may include a status information storage 316_0 for storing the status information INF_ST on a corresponding one among the nonvolatile memories 310 to 3n0 and an input/output line information storage 316_1 for storing information on the input/output lines coupled to the corresponding nonvolatile memory.

The status information storage 316_0 may store the status information INF_ST indicating the operation statuses of the corresponding nonvolatile memory. The status information INF_ST may be stored as data '0' or '1' to indicate the operation status of the corresponding nonvolatile memory, as described with reference to FIG. 2, and continuously updated according to the operation status of the corresponding nonvolatile memory. The status information storage 316_0 may output the stored status information INF_ST in response to an operation check command for the status check operation to the corresponding nonvolatile memory.

The input/output line information storage 316_1 may store information of the input/output line corresponding to the corresponding nonvolatile memory. For example, when the first nonvolatile memory 310 is configured to correspond to the first input/output line IO01, the input/output line information storage 316_1 of the first nonvolatile memory 310 may store information on the first input/output line IO1, and output the stored information as the input/output line select information SEL_IO during the status check operation.

The input/output circuit 317 may output the status information INF_ST received from the control logic 316 in response to the input/output line select information SEL_IO also received from the control logic 316. For example, the input/output circuit 317 may output the status information INF_ST including the response waiting information through the selected input/output line in response to the input/output line select information SEL_IO.

Figure 4:
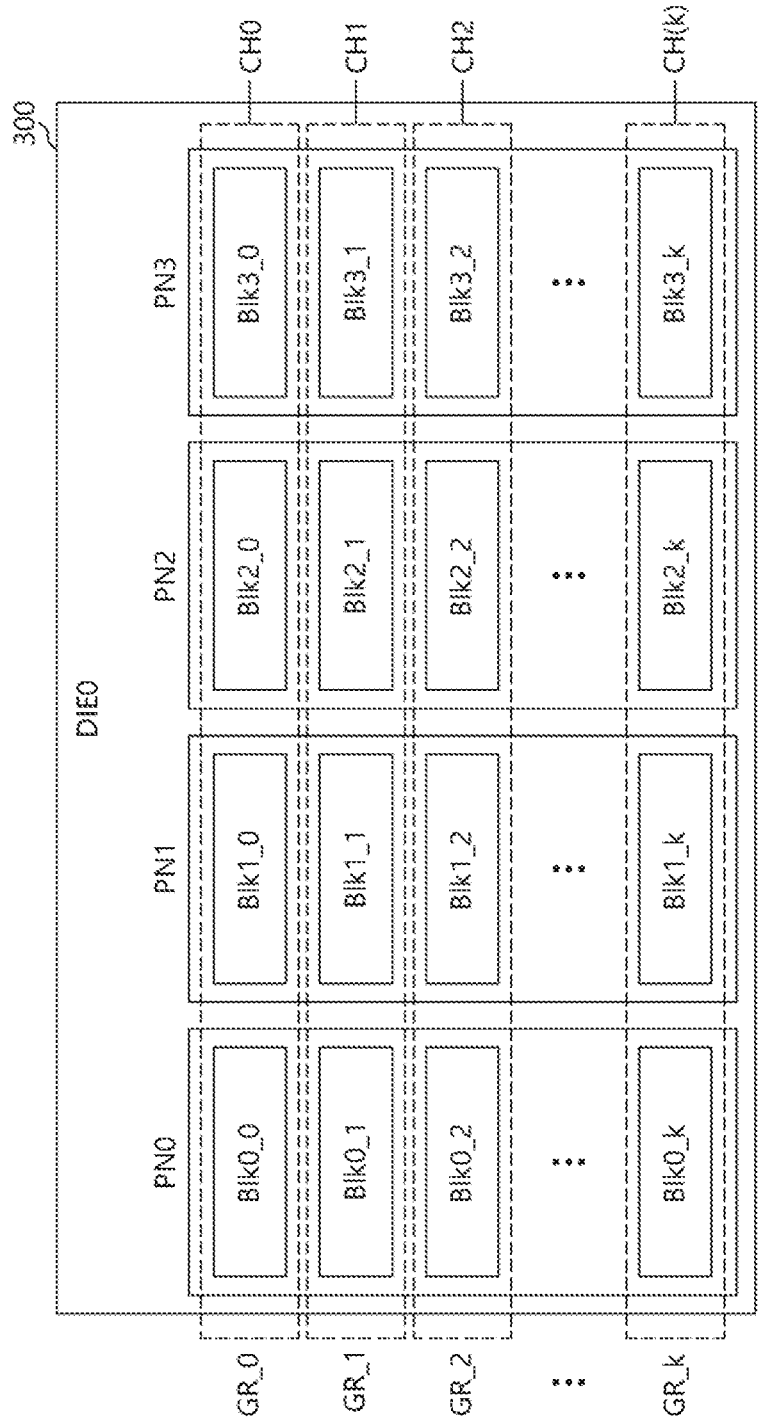
FIG. 4 illustrates a plurality of storage groups in which operation information is determined, in accordance with an embodiment of the present invention.

FIG. 4 illustrates a plurality of storage groups whose operation information is determined. FIG. 4 illustrates that the status information on each group including a plurality of memory blocks sharing the same channels is managed. However, the present embodiment is not limited thereto, but the grouping unit may be changed any time.

Referring to FIGS. 1 to 4, the nonvolatile memory device 300 in accordance with the present embodiment may include a plurality of storage groups GR_0 to GR_k, and each of the storage groups GR_0 to GR_k may include a plurality of nonvolatile memories 310 to 3n0.

FIG. 4 illustrates that one die DIE0 includes four planes PN0 to PN3 and each of the planes includes k memory blocks. For example, plane PN0 includes memory blocks Blk0_0 to Blk0_k, and plane PN1 includes memory blocks Blk1_0 to Blk1_k. A plurality of memory blocks Blk0_0 to Blk3_0 coupled to a channel CH0 may be included in the respective planes PN0 to PN3. The plurality of memory blocks Blk0_0 to Blk3_0 coupled to the channel CH0 may be set to the group GR_0. Similarly, a plurality of memory blocks Blk0_1 to Blk3_1 coupled to the channel CH1 may be set to the group GR_1, and a plurality of memory blocks coupled to the channels CH2 to CH(k) may also be grouped in the same manner. As described with reference to FIG. 1, one memory block may include a plurality of pages. Therefore, each of the groups GR_0 to GR_k may include the plurality of pages.

FIG. 5 is a flowchart illustrating a process of determining whether an operation performed by a nonvolatile memory device is completed.

Referring to FIGS. 1 and 5, a process of determining whether an operation of the nonvolatile memory device 300 is completed in response to a request of the host device 400 will be described in detail as follows.

At step S1000, the controller 100 may receive a host request from the host device 400. As described with reference to FIG. 1, the controller 100 may receive the request through the host interface 130. The host request may be received from the host device 400 for various kinds of operations to be performed by the electronic device 10. For example, the host request may include a write request for writing data to the nonvolatile memories 310 to 3n0, a read request for reading data stored in the nonvolatile memories 310 to 3n0, and an erase request for erasing data stored in one or more memory blocks of the nonvolatile memories 310 to 3n0. Hereafter, suppose that the host request is a write request for writing data.

At step S2000, in response to a write request of the host device 400, the controller 100 may generate an internal command, and transfer the generated internal command to the nonvolatile memory device 300 for a target one among the nonvolatile memories 310 to 3n0. For example, the internal command may include write data and an address indicating a region in which the write data is to be stored in the target nonvolatile memory.

At step S2100, an operation such as the write operation may be performed by the nonvolatile memory device 300 in response to the internal command. For example, the write data received from the controller 100 may be stored in the page buffer of the target nonvolatile memory in the nonvolatile memory device 300, and the write data may be stored in the region of the target nonvolatile memory indicated by the address received from the controller 100.

At step S3000, the controller 100 may determine whether a waiting time has elapsed after the internal command is transferred to the nonvolatile memory device 300, and transfer a status check command for the target nonvolatile memory to the nonvolatile memory device 300 at the point of time that the waiting time has elapsed. The waiting time may be set in advance, and set differently depending on the types of the commands. For example, different waiting times may be set for the write command, the read command and the erase command, respectively. The status check command may include a request for information on whether an operation corresponding to the transferred internal command is completed, that is, whether the target nonvolatile memory is busy or ready.

At step S4000, the status information INF_ST of the target nonvolatile memory may be transferred to the controller 100 from the nonvolatile memory device 300 in response to the status check command. The status information INF_ST of the target nonvolatile memory may indicate whether an operation corresponding to the internal command (for example, write operation) is completed. Specifically, the status information INF_ST may include "ready" status information indicating that the target nonvolatile memory is available or "busy" status information indicating that the target nonvolatile memory is performing an operation. That is, the status information INF_ST may include a ready/busy signal. The status information INF_ST indicating that the target nonvolatile memory is available or ready may be expressed as status information INF_ST including "response waiting information".

At step S5000, the controller 100 may determine whether the status information INF_ST of the target nonvolatile memory received from the nonvolatile memory device 300 includes the response waiting information. When the status information INF_ST includes the response waiting information as described above (that is, "Yes" at step S5000), the controller 100 may determine that the write operation to the target nonvolatile memory corresponding to the internal command is completed at step S7000. Thus, the controller 100 may generate a new internal command and transfer the generated internal command to the target nonvolatile memory through the nonvolatile memory device 300.

At step S6000, when the status information INF_ST of the target nonvolatile memory received from the nonvolatile memory device 300 does not include response waiting information (that is, "No" at step S6000), the controller 100 may regenerate the status check command for the target nonvolatile memory. At step S6100, the controller 100 may transfer the regenerated status check command to the target nonvolatile memory through the nonvolatile memory device 300. At step S4100, the nonvolatile memory device 300 may transfer the status information INF_ST of the target nonvolatile memory to the controller 100 in response to the status check command, the status information INF_ST indicating whether the operation to the target nonvolatile memory corresponding to the internal command is completed. Then, step S5000 may be performed, in which the controller 100 may determine whether the status information INF_ST of the target nonvolatile memory received from the nonvolatile memory device 300 includes the response waiting information.

As described above, the controller 100 may transfer the internal command to the nonvolatile memory device 300, and transfer the status check command for the status information INF_ST after the waiting time has elapsed from the point of time that the internal command is transferred. At this time, the waiting time may be differently set depending on the type of the internal command (for example, write command, read command and erase command). When the status information INF_ST is acquired from the nonvolatile memory device 300, the controller 100 may determine whether the status information INF_ST includes the response waiting information (or the ready status information). Then, the controller 100 may determine whether the operation corresponding to the internal command is completed. When the waiting time is fixed, time which is actually required for performing the internal operation may not be reflected to the fixed waiting time. Specifically, when the time required for performing the internal operation is smaller than the fixed waiting time, the target nonvolatile memory may not be used during a time period from the point of time that the internal operation is completed to the point of time that the status check command is transferred. On the other hand, when the time required for performing the internal operation is larger than the fixed waiting time, the status information INF_ST which does not include the response waiting information or the status information INF_ST including the busy status information is highly likely to be outputted in the case where the status check command which is initially generated for the corresponding internal operation is transferred. Therefore, the number of times that the status check command is regenerated may be increased while unnecessary resources are consumed.

FIGS. 6 and 7 are flowcharts illustrating an operating method of the electronic device 10 in accordance with an embodiment. Hereafter, it is assumed that the operations corresponding to steps S1000 to S7000 of FIG. 5 are applied in a similar manner except that the waiting time is not fixed but flexible in accordance with an embodiment of the present invention.

The electronic device 10 in accordance with the present embodiment may include the controller 100 and the non-transitory machine-readable storage medium 200 which outputs the status information INF_ST of a target nonvolatile memory among the nonvolatile memories 310 to 3n0 in response to the status check command to the target nonvolatile memory, and stores encoded instructions that can be executed by the controller 100. In an embodiment, the non-transitory machine-readable storage medium 200 may be configured as the nonvolatile memory device 200.

In an embodiment, the nonvolatile memory device 300 may store an instruction which corresponds to a host request received from the host device 400 and generates an internal command performed by the nonvolatile memory device 300, an instruction which generates the status check command transferred to the nonvolatile memory device 300 at the point of time that the waiting time corresponding to the internal command has elapsed after the internal command was transferred to the nonvolatile memory device 300, an instruction which determines the operation information of the nonvolatile memory device 300 based on the status information, and an instruction which variably sets the waiting time based on the operation information. The instruction stored in the nonvolatile memory device 300 may be may be implemented by the controller 100.

Referring to FIGS. 1, 5 and 6, the operating method of the electronic device 10 in accordance with the present embodiment may further include step S8000, in which the controller 100 determines whether the number of pieces of first status information has reached a preset value and step S8100, in which the controller 100 shortens the waiting time corresponding to the internal command when the number of pieces of first status information has reached the preset value (that is, "Yes" at step S8000).

In an embodiment, the number of pieces of first status information may indicate the number of times that the controller 100 receives the first status information. In an embodiment, the first status information may indicate the status information INF_ST including the response waiting information (or ready status information) in response to an initial status check command.

Suppose that the internal command is a command for requesting a write operation, and the preset value is 2. When a write operation is performed in response to a first write command and the status information corresponding to an initial status check command corresponding to the first write command includes the response waiting information, the controller 100 may determine that the write operation in response to the first write command has been completed. At this time, since the status information received by the controller 100 corresponds to the initial status check command corresponding to the first write command, the status information may be the first status information, and the number of pieces of first status information becomes 1.

Then, when a write operation is performed in response to a second write command, the status information corresponding to an initial status check command corresponding to the second write command does not include response waiting information, and the status information corresponding to a regenerated status check command includes the response waiting information, the controller 100 may determine that the write operation in response to the second write command has been completed. In this case, since the status information including the response waiting information not the status information corresponding to the initial state check command, the status information may not be the first status information. Therefore, the number of pieces of first status information is still 1.

Then, when a write operation is performed in response to a third write command and the status information corresponding to an initial status check command corresponding to the third write command includes the response waiting information, the status information may be the first status information. Therefore, the number of pieces of first status information becomes 2.

When the write operation is completed in response to the third write command, the controller 100 may shorten the waiting time corresponding to the write command because the first status information has reached the preset status value. At this time, an amount of decrease in the waiting time may be set in advance, and changed any time.

Similarly, the process of variably setting the waiting time corresponding to the write command may be applied to other kinds of internal commands such as the read command and the erase command.

As described with reference to FIG. 4, the nonvolatile memory device 300 in accordance with the present embodiment may include the plurality of storage groups GR_0 to GR_k, and each of the storage groups may include the plurality of nonvolatile memories 310 to 3n0. Furthermore, the process of regenerating the status check command and counting the number of pieces of first information may be separately performed in response to the status information of the respective storage groups GR_0 to GR_k. At this time, the controller 100 may determine the operation information of the respective storage groups GR_0 to GR_k based on the status information of the storage groups GR_0 to GR_k and the number of pieces of first status information, and set waiting times applied to the respective storage groups based on the operation information of the respective storage groups GR_0 to GR_k. Therefore, the waiting times applied to the respective storage groups GR_0 to GR_k may be set equally or differently based on the operation information of the respective storage groups GR_0 to GR_k.

In an embodiment, the status information may include the status information of the plurality of nonvolatile memories 310 to 3n0, and the process of regenerating the status check command and counting the number of pieces of first status information may be separately performed in response to the status information of the nonvolatile memories 310 to 3n0. At this time, the controller 100 may determine the operation information of the nonvolatile memories 310 to 3n0 based on the status information of the nonvolatile memories 310 to 3n0 and the number of differently first status information, and set the waiting times applied to the nonvolatile memories 310 to 3n0 based on the operation information of the nonvolatile memories 310 to 3n0. Therefore, the waiting times applied to the respective nonvolatile memories 310 to 3n0 may be set equally or differently based on the operation information of the nonvolatile memories 310 to 3n0.

Referring to FIGS. 1, 5 and 7, the operating method of the electronic device 10 in accordance with the present embodiment may further include step S9000, in which the controller 100 counts the number of times that the status check command is regenerated and determines whether the count value has reached a preset value (or the count value is greater than or equal to the presser value), and step S9100, in which the controller 100 extends the waiting time corresponding to the internal command.

Suppose that the internal command is a command for requesting an erase operation, and the preset value is 2. When an erase operation is performed in response to a first erase command and the status information corresponding to an initial status check command corresponding to the first erase command includes response waiting information, the controller 100 may determine that the erase operation in response to the first erase command is completed. At this time, since the controller 100 did not regenerate the status check command corresponding to the first erase command, the number of times that the status check command is regenerated becomes 0.

Then, when erase operations are performed in response to second and third erase commands and operation of regenerating the status check command is performed during each of the erase operations, the number of times that the status check command is regenerated becomes 2 and reaches the preset value. Therefore, the controller 100 may extend the waiting time corresponding to the erase command. At this time, an amount of increase in the waiting time may be set in advance, and changed any time.

Similarly, the process of variably setting the waiting time corresponding to the erase command may be applied to other kinds of internal commands such as the write command and the read command.

In an embodiment, the controller 100 may count the number of times that the status check command is regenerated during operations respectively in response to two or more commands of the same type, and adjust the waiting time based on the count value. For example, the controller 100 may count the number of status check commands which are regenerated three times during a single erase operation in response to a single erase command. When the number of status check commands which are regenerated three times during each erase operations respectively in response to two or more erase commands is equal to or more than a threshold value, the controller 100 may variably set the waiting time.

As described with reference to FIG. 4, the nonvolatile memory device 300 in accordance with the present embodiment may include the plurality of storage groups GR_0 to GR_k. In an embodiment, each of the storage groups GR_0 to GR_k may include a plurality of nonvolatile memories 310 to 3n0. Furthermore, the process of regenerating the status check command and counting the number of times that the status check command is regenerated may be separately performed in response to the status information of the respective storage groups GR_0 to GR_k. At this time, the controller 100 may determine the operation information of the respective storage groups GR_0 to GR_k based on the status information of the storage groups GR_0 to GR_k and the number of times that the status check command is regenerated, and set waiting times applied to the respective storage groups GR_0 to GR_k based on the operation information of the storage groups GR_0 to GR_k. Therefore, the waiting times applied to the respective storage groups GR_0 to GR_k may be set equally or differently based on the operation information of the storage groups GR_0 to GR_k.

In an embodiment, the status information may include the status information of the plurality of nonvolatile memories 310 to 3n0, and the process of regenerating the status check command and counting the number of times that the status check command is regenerated may be separately performed in response to the status information of the nonvolatile memories 310 to 3n0. At this time, the controller 100 may determine the operation information of the nonvolatile memories 310 to 3n0 based on the status information of the nonvolatile memories 310 to 3n0 and the number of times that the status check command is regenerated, and set the waiting times applied to the nonvolatile memories 310 to 3n0 based on the operation information of the nonvolatile memories 310 to 3n0. Therefore, the waiting times applied to the respective nonvolatile memories 310 to 3n0 may be set equally or differently based on the operation information of the nonvolatile memories 310 to 3n0.

As the number of E/W (erase/write) times is increased, the time at which an operation is completed in the nonvolatile memory device 30 may be changed. In particular, during the write operation, the operation completion time may be shortened as the E/W count is increased. Furthermore, during the erase operation, the operation completion time may be delayed as the E/W count is increased. In the present embodiment, when the waiting time is variably set based on the status information received from the nonvolatile memory device 300, the controller 100 may reflect the changed operation completion time, thereby minimizing the disadvantage that a specific nonvolatile memory is not used but waits even though the nonvolatile memory can be used, or a resource is additionally consumed while an additional command (status check command) is repeatedly regenerated. In particular, the controller 100 may distinguish and determine the status information for each of the command types (write command, read command and erase command), and separately apply the variably set waiting times, which makes it possible to operate the system more efficiently.

In accordance with the present embodiments, the electronic device can adjust the time to output the status check command based on the status information of a memory chip corresponding to the status check command or the number of program/erase operations in the memory chip, and minimize the number of times that the status check command is outputted, thereby improving the performance of the system including the electronic device.

While various embodiments have been described above, it will be understood to those skilled in the art that the embodiments described are examples only. Accordingly, the operating method of a data storage device described herein should not be limited based on the described embodiments.

Figure 8:
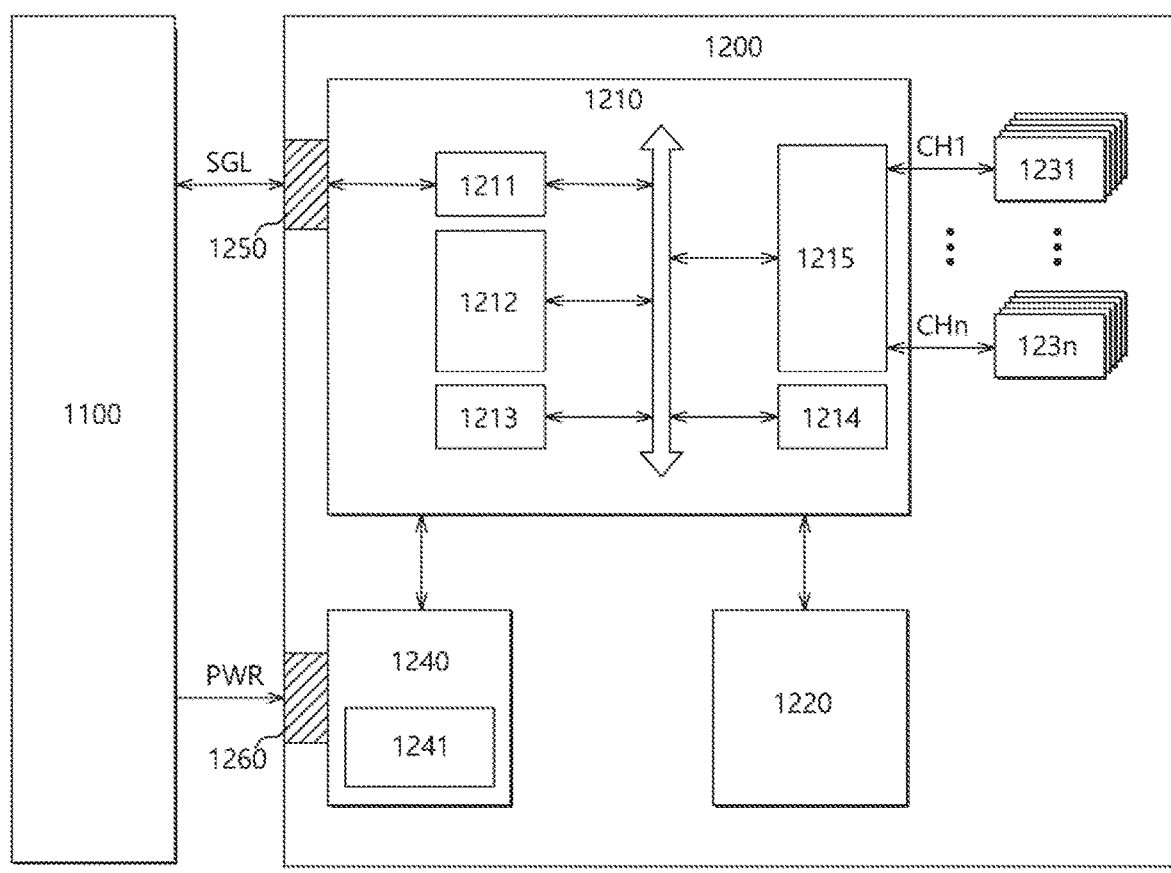
FIG. 8 illustrates a data processing system including an SSD in accordance with an embodiment of the present invention.

FIG. 8 is a diagram illustrating an example of a data processing system including a solid state drive (SSD) in accordance with an embodiment. Referring to FIG. 8, a data processing system 1000 may include a host device 1100 and a solid state drive (SSD) 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface 1211, a control component 1212, a random access memory 1213, an error correction code (ECC) component 1214, and a memory interface 1215.

The host interface 1211 may exchange a signal SGL with the host device 1100 through the signal connector 1250. The signal SGL may include a command, an address, data, and so forth. The host interface 1211 may interface the host device 1100 and the SSD 1200 according to the protocol of the host device 1100. For example, the host interface 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS).

The control component 1212 may analyze and process a signal SGL inputted from the host device 1100. The control component 1212 may control operations of internal function blocks according to a firmware or a software for driving the SSD 1200. The random access memory 1213 may be used as a working memory for driving such a firmware or software.

The error correction code (ECC) component 1214 may generate the parity data of data to be transmitted to the nonvolatile memory devices 1231 to 123n. The generated parity data may be stored together with the data in the nonvolatile memory devices 1231 to 123n. The error correction code (ECC) component 1214 may detect an error of the data read out from the nonvolatile memory devices 1231 to 123n, based on the parity data. If a detected error is within a correctable range, the error correction code (ECC) component 1214 may correct the detected error.

The memory interface 1215 may provide control signals such as commands and addresses to the nonvolatile memory devices 1231 to 123n, according to control of the control component 1212. Moreover, the memory interface 1215 may exchange data with the nonvolatile memory devices 1231 to 123n, according to control of the control component 1212. For example, the memory interface 1215 may provide the data stored in the buffer memory device 1220, to the nonvolatile memory devices 1231 to 123n, or provide the data read out from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123*n* according to control of the controller 1210.

The nonvolatile memory devices 1231 to 123*n* may be used as storage media of the SSD 1200. The nonvolatile memory devices 1231 to 123*n* may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
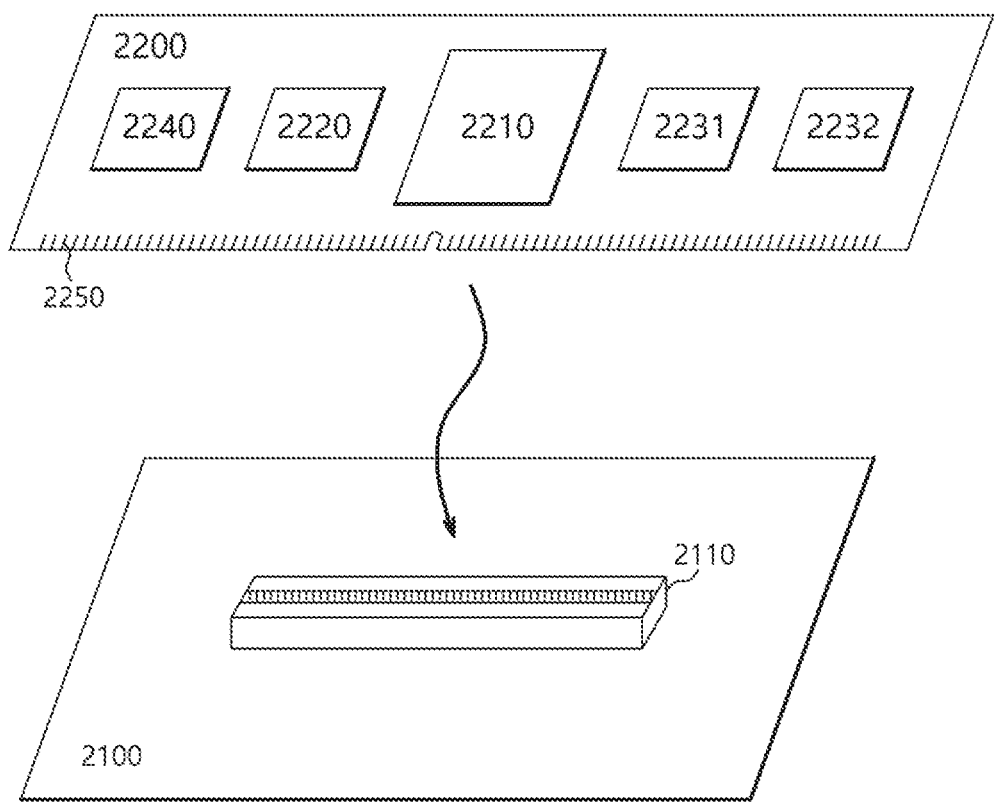
FIGS. 9 and 10 illustrate a data processing system including a memory system in accordance with an embodiment of the present invention.

FIG. 9 is a diagram illustrating an example of a data processing system including a data storage device in accordance with an embodiment. Referring to FIG. 9, a data processing system 2000 may include a host device 2100 and a data storage device 2200.

The host device 2100 may be configured in the form of a board such as a printed circuit board. Although not shown, the host device 3100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 8.

The buffer memory device 2220 may temporarily store data to be stored in the nonvolatile memory devices 2231 and 2232. Further, the buffer memory device 2220 may temporarily store the data read out from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 10:
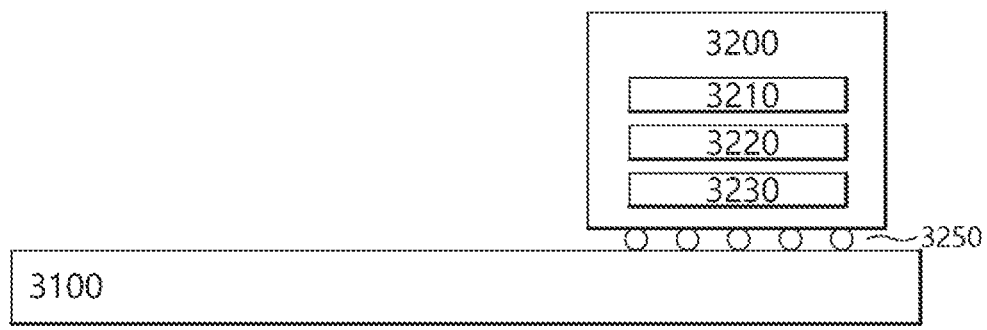

FIG. 10 is a diagram illustrating example of a data processing system including a data storage device in accordance with an embodiment. Referring to FIG. 10, a data processing system 3000 may include a host device 3100 and a data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 9.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as a storage medium of the data storage device 3200.

Figure 11:
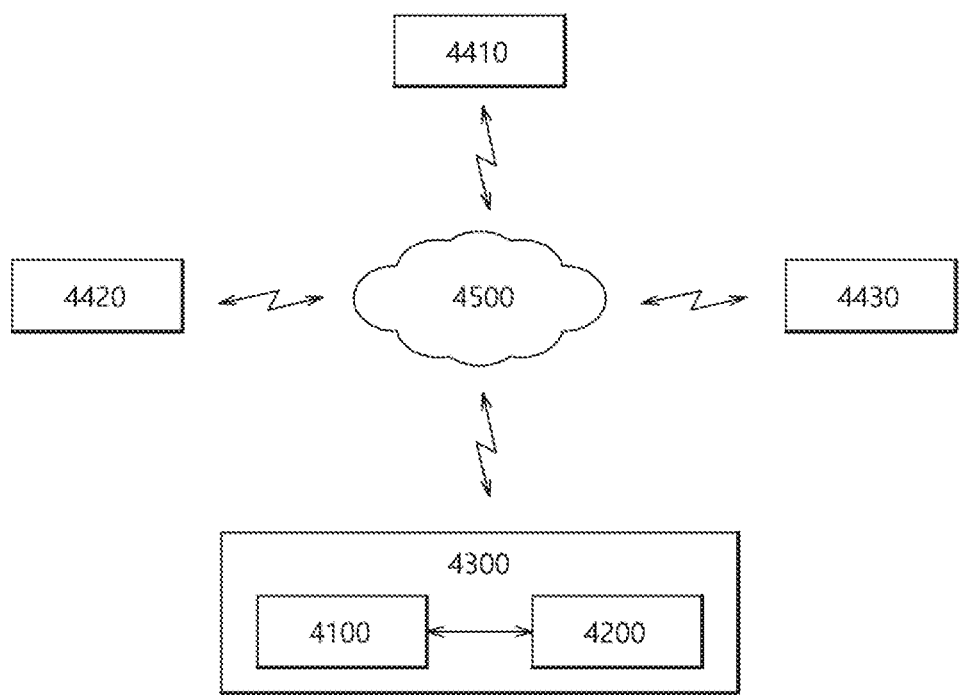
FIG. 11 illustrates a network system including a memory system in accordance with an embodiment of the present invention.

FIG. 11 is a diagram illustrating an example of a network system including a data storage device in accordance with an embodiment. Referring to FIG. 11, a network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and a data storage device 4200. The data storage device 4200 may be constructed by the electronic device 10 shown in FIG. 1, the SSD 1200 shown in FIG. 8, the data storage device 2200 shown in FIG. 9 or the data storage device 3200 shown in FIG. 10.

What is claimed is:

1. An electronic device comprising:
   a controller; and
   a non-transitory machine-readable storage medium comprising a plurality of storage groups, each of which comprises a plurality of nonvolatile memories, wherein each of the storage groups is configured to output status information in response to a status check command, and store instructions which are executed by the controller,
   wherein, for each storage group, the instructions comprise:

an instruction for generating an internal command to be serviced by the non-transitory machine-readable storage medium;

an instruction for generating the status check command to transfer to the corresponding storage group at a time at which a waiting time has elapsed after the internal command is transferred to the corresponding storage group;

an instruction for determining the operation status of the corresponding storage group based on the status information; and an instruction for variably setting the waiting time for the corresponding storage group based on its operation status, wherein the waiting time for each of the storage groups is set based on the operation status of the corresponding storage group, independently of the setting of the waiting time for each of the other storage groups.

2. The electronic device according to claim 1, wherein the instruction for determining the operation status of a corresponding storage group is an instruction for determining the operation status based on whether response waiting information indicating that an operation by the internal command is completed is included in the status information.

3. The electronic device according to claim 2, wherein the instruction for determining the operation status of the corresponding storage group comprises:

an instruction for regenerating the status check command when the response waiting information is not included in the status information; and an instruction for counting the number of pieces of first status information including the response waiting information and provided in response to initial status check commands.

4. The electronic device according to claim 3, wherein the instruction for variably setting the waiting time for the corresponding storage group is an instruction for shortening the waiting time when the number of pieces of first status information reaches a preset value.

5. The electronic device according to claim 2, wherein the instruction for determining the operation status of the corresponding storage group comprises:

an instruction for regenerating the status check command when the response waiting information is not included in the status information; and an instruction for counting the number of times that the status check command is regenerated.

6. The electronic device according to claim 5, wherein the instruction for variably setting the waiting time for the corresponding storage group is an instruction for extending the waiting time when the number of times that the status check command is regenerated reaches a preset value.

7. The electronic device according to claim 1, wherein the instruction for setting the waiting time for a corresponding storage group in which the number of pieces of first status information has reached a preset value shortens the waiting time from a preset time.

8. An operating method of an electronic device, the operating method comprising:

generating an internal command to be serviced by the electronic device;

generating a status check command after a waiting time corresponding to the internal command is elapsed;

determining operation status of the electronic device based on status information which is generated in response to the status check command; and variably setting the waiting time based on the operation status, wherein the variably setting of the waiting time comprises shortening the waiting time when the number of pieces of first status information including response waiting information provided in response to initial status check commands reaches a first preset value, and wherein the variably setting of the waiting time comprises extending the waiting time when the number of times that the status check command is regenerated reaches a second preset value.

9. The operating method according to claim 8, wherein the determining of the operation status comprises determining the operation status based on whether the response waiting information indicating that an operation by the internal command is completed is included in the status information.

10. The operating method according to claim 9, further comprising regenerating the status check command when the status information does not include the response waiting information.

11. The operating method according to claim 9, wherein the determining of the operation status comprises determining the operation status based on the number of pieces of the first status information including the response waiting information and provided in response to the initial status check commands.

12. The operating method according to claim 10, wherein the determining of the operation status comprises determining the operation status based on the number of times that the status check command is regenerated.

* * * * *